Nov. 6, 1934.                RB NILES                1,980,080
                        ADJUSTABLE CONNECTER
                         Filed May 11, 1931

Inventor
RB Niles
By
Attorney

Patented Nov. 6, 1934

1,980,080

UNITED STATES PATENT OFFICE 1,980,080

ADJUSTABLE CONNECTER

RB Niles, Minneapolis, Minn., assignor to Marquette Manufacturing Company, Inc., St. Paul, Minn., a corporation of Minnesota Application May 11, 1931, Serial No. 536,444

10 Claims. (Cl. 285—1)

My invention relates to an adjustable connecter for coupling a flexible hose or the like in close quarters where a limited space is found, such as in the water connections of the cooling system of an automobile and the radiator. A connecter is provided with a head portion having a tubular end adapted to receive a flexible hose or connection on one end and the other end is flattened and formed with a depressed connecter collar extending virtually right-angular to the hose receiving end. This forms a compact connecter head so as to provide a coupling in small or narrow spaces.

A feature of the connecter resides in an adjustable filler connecter member which may be rotated to adjust the opening in the same to different positions in relation to the axis of the connecting collar and also which may be replaced by other filler members which have different size holes therein for engagement with different size radiator and engine connections on the cooling system pipes of an automobile.

The connecter is provided with a flexible clamping means which engages the collar on the flattened end thereof and which also holds the filler in adjusted position with an adjustable clamp adapted to tighten the filler in operative position and to simultaneously tighten the filler over the pipe to which it is being connected, thereby providing an adjustable water-tight joint in the connecter.

Further features and details will be more fully defined.

In the drawing forming part of this specification:

Figure 1:
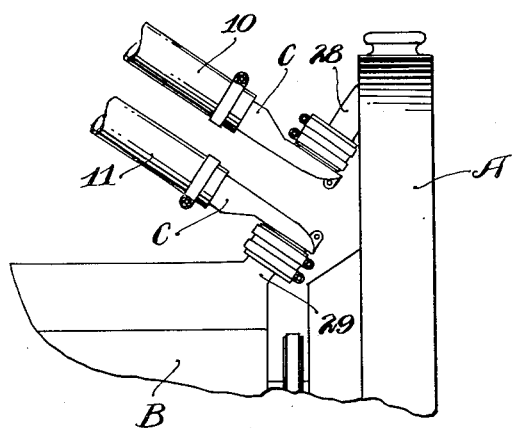
Figure 1 illustrates my connecter as it would appear in use on an engine and radiator.
Figure 2:
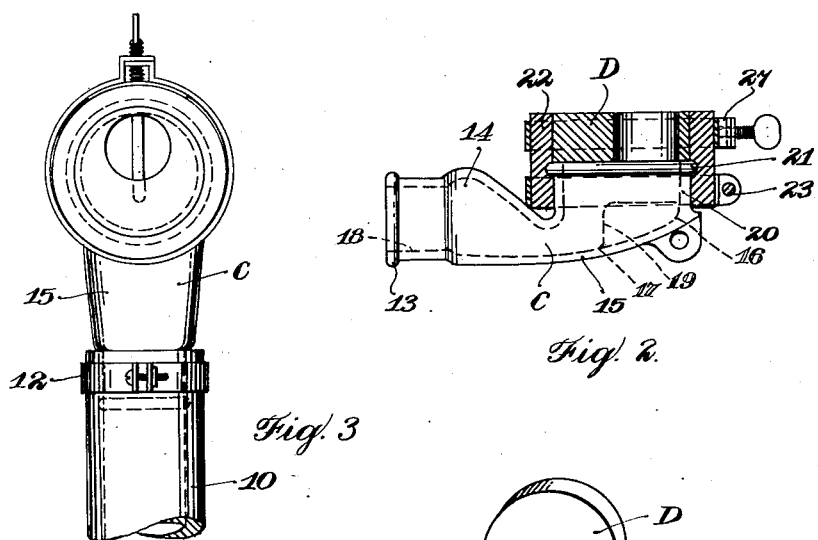
Figure 2 is a side view of the same, a portion of which is illustrated in cross section.
Figure 3:
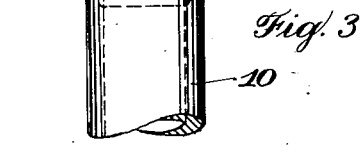
Figure 3 is a view of my connecter, looking into one end.
Figure 4:
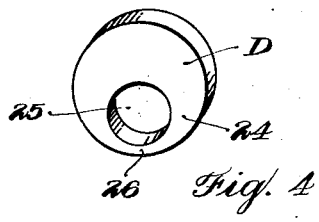
Figure 4 illustrates a perspective view of one of the fillers used with my connecter.
Figure 5:
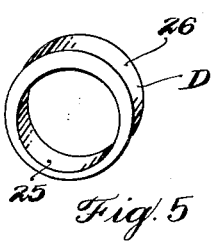
Figure 5 illustrates another filler used in my connecter with the same outside diameter as the connecter in Figure 4.

The drawing illustrates a portion of an automobile radiator A which is positioned adjacent the engine B, only a portion of which is illustrated, and I have shown two of my connecters C used to couple or connect the radiator and the engine through the flexible pipes 10 and 11. These pipes 10 and 11 may be of regular rubber hose or any other suitable material and the pipes 10 and 11 are adapted to be held to the connecters C by the clamping members 12 which pinch the hose 10 or 11 over the annular shoulders 13 formed on the tubular end 14 of the head 15 of the connecter C.

The head 15 is of a tubular construction and the end 14 is of a cylindrical nature, like an ordinary tube or pipe, while the other end 16 is flattened to provide a fluid passageway 17 through the flattened portion 16 of an equal cross sectional capacity as the opening 18 in the end 14. A reinforcing or dividing rib 19 may be provided in the outlet of the flattened end 16 to prevent the radiator or engine pipes from being inserted too far into the connecter and to reinforce the flattened end 16 in the construction of the same.

The end 16 is formed with a collar portion 20 having an outer shoulder or rib 21. This collar 20 forms a connection virtually at right-angles to the tubular end 14 and owing to the flattened formation of the portion 16 the outer edge formed by the bead or shoulder 21 of the collar 20 is virtually in line with the longitudinal cylindrical surface of the portion 14 of the connecter C. In this manner a close coupling is provided by the peculiar formatiion of the head C. A suitable short hose connecter made of rubber or other flexible material 22, is adapted to be held by the clamp 23 to the collar 20. This forms the flexible clamping member for receiving the interchangeable fillers D.

The fillers D are made of rubber or other suitable material which provides a body portion 24 of a compressible nature. The filler D is like a thick washer member and is formed with a hole 25 in the same. The hole 25 will vary in the different fillers D so that some holes will be larger than others and this hole is preferably offset from the axis of the filler D so that one side of the hole is closer to the outer peripheral edge 26. In other words, the hole 25 is offset within the body 24 of the filler D. If the hole 25 is large enough, then it will be placed co-axial with the periphery 26. The filler D is held in the hose 22 by a suitable clamping member 27 and thus the filler D may be adjusted in the hose 22 to turn it around so that the hole 25 will be closer to one side than to the other if it is desired. This provides a connecter C with an adjustable coupling or filler D which may be turned so that the edge of the connecter can be brought into close quarters with a connecting pipe like 28 on the radiator A where a portion of the pipe 28 is close to the radiator itself, leaving only a small space for the edge of the connecter A to engage with the pipe 28. The filler D may be readily rotated so that the hole 25 may be placed closer to one side than to the other of the connecter hose 22 of the connecter C. In this manner the connecter C provides an adjustable connection for close quarters for making a hose connection with a radiator and engine. In some engine structures of automobiles the connections with the pipes 10 and 11 are desired to be made at the bottom of the radiator rather than at the top and the space is very close so that the connecter C provides a very desirable and practical means of connecting the parts together. My connecter is particularly adaptable for use with pipes such as 10 and 11 which connect up with a suitable flushing means for flushing cleansing liquid through the cooling system of the internal combustion engine and the radiator. I have not illustrated the flushing unit but have shown the pipes 10 and 11 thereof. These pipes 10 and 11 may couple with any flushing medium so that the radiator A and engine B of an automotive cooling system may be readily cleansed. There are other places where my connecter C provides a very adaptable connection and owing to the ready and easy manner in which the fillers D may be changed so that different size openings 25 may be obtained, I have found my connecter to be very desirable. The body of the connecter C is soft enough so it will compress when the clamp 27 is squeezed over the hose 22, thus pinching the filler and the hose 22 tightly together over the pipe such as 28 or the engine connecting pipe 29.

In accordance with the patent statutes I have described the principles of my connecter and have endeavored to represent some of the best embodiments thereof, however, it is apparent that variations may be made within the scope of the following claims.

I claim:

1. A connecter having a tubular cylindrical end adapted to receive a hose and hose clamp on one end, a flattened head portion on the other end extending along one side of said tubular portion, a connecting collar carried by said flattened portion to provide an angular connection with said tubular portion, a short flexible hose clamped on said collar, a removable adjustable filler washer, and a clamp for supporting said filler washer in the outer end of said hose.

2. A connecter including, a cylindrical tubular end, a flattened head portion oppositely disposed to said cylindrical end, a collar formed projecting from one side of said head portion with its outer edge virtually in line with one side of said tubular portion, a flexible hose connected to said collar, and a compressible filler washer adjustably clamped in said hose, said filler washer having an opening therethrough offset from the axis thereof.

3. A hose connecter including, a tubular body portion having a cylindrical hose receiving end, a flattened end portion projecting in line with said tubular end on one side and having a hose receiving projecting collar from the other side thereof, a short hose coupling clamped to said collar, a filler washer, and means for securing said washer in the outer end of said hose coupling.

4. A connecter including, a metallic tubular body, a cylindrical tubular hose receiving end formed on said body, a short hose coupling receiving collar depressed into one side of said body on the other end thereof, a hose coupling connected to said short collar, and an adjustable pliable washer member clamped in the outer end of said hose coupling.

5. A hose connecter including, a tubular body portion, a cylindrical hose receiving end, a flattened head portion depressed into the space virtually equal to the diameter of said cylindrical hose receiving end, a short hose connecting collar formed on said flattened head portion, an opening through said connecter to provide an equal area opening through the entire connecter and a removable pliable washer clamped to said hose receiving end.

6. A hose connecter including, a flexible hose portion, a clamp for supporting said hose portion, and a pliable filler having an offset opening adapted to be held in said hose portion by said clamp.

7. A hose connecter for close quarters including, a body portion flattened on one end, a collar projecting from said flattened portion, a tubular hose connecter on the other end, beads formed on said collar and upon said hose connecting portion, and clamps for clamping the flexible hose on said collar and said connecting portion inwardly of said beads to prevent accidental removal thereof.

8. A connecter comprising, a tubular member having a flattened end portion with one side extending in a longitudinal straight line to one end thereof, a cylindrical hose connected end formed thereon and a hose receiving collar projecting from said flattened body end oppositely disposed to said straight longitudinal side of said connecter, beads at the ends of said hose receiving end and hose receiving collar, and clamps for clamping the hose means on said hose receiving end and hose receiving collar inwardly of said beads.

9. A hose connecter for close quarters including, end collars for receiving a hose and clamp, said collars extending at an angle and in close proximity to each other, one of said collars being depressed in a manner not to project beyond the outer surface of the other of said collars, beads on the outer extremities of said end collars, and clamping means for clamping the hose inwardly of said beads.

10. A hose connecter including, a tubular body portion, a cylindrical hose receiving end, a flattened head portion, a short hose connecting collar formed on said flattened head portion and adapted to project from the side thereof, beads on the outer extremities of said end and collar, and clamps for clamping the flexible hose on said end and collar inwardly of said beads.

RB NILES.